United States Patent
Arnold et al.

(10) Patent No.: US 9,252,944 B2
(45) Date of Patent: Feb. 2, 2016

(54) KEY WRAPPING FOR COMMON CRYPTOGRAPHIC ARCHITECTURE (CCA) KEY TOKEN

(71) Applicant: International Business Machines Corporation, Armonk, NY (US)

(72) Inventors: Todd W. Arnold, Charlotte, NC (US); Gerald K. Boyter, Charlotte, NC (US); Elizabeth A. Dames, Harrisburg, NC (US); Richard V. Kisley, Charlotte, NC (US); Eric B. Smith, Concord, NC (US)

(73) Assignee: International Business Machines Corporation, Armonk, NY (US)

( * ) Notice: Subject to any disclaimer, the term of this patent is extended or adjusted under 35 U.S.C. 154(b) by 47 days.

(21) Appl. No.: 14/221,620

(22) Filed: Mar. 21, 2014

(65) Prior Publication Data

US 2015/0270955 A1 Sep. 24, 2015

(51) Int. Cl.
*H04L 29/06* (2006.01)
*H04L 9/06* (2006.01)
*H04L 9/08* (2006.01)
*H04L 9/30* (2006.01)

(52) U.S. Cl.
CPC ............ *H04L 9/0631* (2013.01); *H04L 9/0816* (2013.01); *H04L 9/30* (2013.01); *H04L 2209/24* (2013.01)

(58) Field of Classification Search
None
See application file for complete search history.

(56) References Cited

U.S. PATENT DOCUMENTS

| | | | |
|---|---|---|---|
| 4,918,728 A | 4/1990 | Matyas et al. | |
| 5,007,089 A | 4/1991 | Matyas et al. | |
| 5,432,849 A | 7/1995 | Johnson et al. | |
| 2008/0130895 A1* | 6/2008 | Jueneman et al. | 380/277 |
| 2010/0158247 A1* | 6/2010 | Hopkins et al. | 380/44 |
| 2010/0306635 A1* | 12/2010 | Tang et al. | 714/807 |
| 2012/0237023 A1* | 9/2012 | Arnold et al. | 380/44 |
| 2012/0307999 A1* | 12/2012 | Arnold et al. | 380/44 |
| 2012/0308000 A1* | 12/2012 | Arnold et al. | 380/44 |

FOREIGN PATENT DOCUMENTS

| | | |
|---|---|---|
| EP | 354774 A2 | 2/1990 |
| EP | 429824 B1 | 3/1996 |
| EP | 0354774 B1 | 4/1996 |
| EP | 0451476 B1 | 5/1996 |
| EP | 0471939 B1 | 12/1998 |

OTHER PUBLICATIONS

ASC X9 ANS X9.102- Wrapping of Keys and Associated Data Nov. 2004.*
IBM, "CCA Basic Services Reference and Guide for the IBM 4765 PCIe and IBM 4764 PCI-X Cryptographic Coprocessors Releases 4.4, 4.3, 4.2, 4.1, 3.60, 3.30, 317, and 3.25," Twenty-Fifth Edition (Nov. 2013), Copyright IBM Corporation 2007, 2013; refer to Appendix C. CCA control-vector definitions and key encryption—pp. 881-902 and the "Key Tokens" subsection of "Appendix B. Data Structures" pp. 741-784.

* cited by examiner

*Primary Examiner* — David Pearson
(74) *Attorney, Agent, or Firm* — Cantor Colburn LLP; Steven Chiu (57) ABSTRACT

Embodiments relate to wrapping of a common cryptographic architecture (CCA) key token. An aspect includes wrapping, by an exporting computer, the CCA key token using a key wrapping export function, the CCA key token comprising a CCA key data section and an unencrypted control vector. Another aspect includes splitting the control vector into a first control vector portion and a second control vector portion. Another aspect includes encrypting the CCA key data section and the first control vector portion using an key encrypting key (KEK) to generate a wrapped key block. Another aspect includes binding the second control vector portion to the wrapped key block to form an associated data section, wherein the associated data section is not encrypted, and wherein the wrapped key block and the associated data section comprise a wrapped key token.

15 Claims, 6 Drawing Sheets

KEY WRAPPING FOR COMMON CRYPTOGRAPHIC ARCHITECTURE (CCA) KEY TOKEN

BACKGROUND

The present invention relates generally to encryption, and more specifically, to key wrapping for a common cryptographic architecture (CCA) key token.

Various methods exist in support of electronic data security. Cryptography is the transformation of intelligible information into apparently unintelligible form in order to conceal the information from unauthorized parties. Cryptography is used various purposes, such as to protect information transmitted through communications networks. It can also be the most economical way to protect stored data. Cryptographic procedures can be used not only to protect the privacy of data, but also the integrity of data.

The cryptographic transformation of data is ordinarily defined by a selected algorithm, or procedure, under the control of a key. Since the algorithm is normally public knowledge, protection of the transformed, or enciphered, data depends on secrecy of the key. Thus the key must be kept secret to prevent an opponent from simply using the known algorithm and key to recover the enciphered data. The protection of the data therefore hinges on the protection of secret keys.

SUMMARY

Embodiments include a method, system, and computer program product for wrapping for a common cryptographic architecture (CCA) key token. An aspect includes wrapping, by an exporting computer, the CCA key token using a key wrapping export function, the CCA key token comprising a CCA key data section and an unencrypted control vector. Another aspect includes splitting the control vector into a first control vector portion and a second control vector portion; encrypting the CCA key data section and the first control vector portion using an key encrypting key (KEK) to generate an wrapped key block. Another aspect includes binding the second control vector portion to the AES wrapped key block to form an associated data section, wherein the associated data section is not encrypted, and wherein the wrapped key block and the associated data section comprise a wrapped key token.

Further embodiments include receiving an wrapped key token by an importing computer, the wrapped key token comprising an encrypted wrapped key block and an unencrypted associated data section that is bound to the wrapped key block. Another aspect includes unwrapping, by the importing computer, the wrapped key token using a key wrapping import function to form the CCA key token comprising a CCA key data section and an unencrypted control vector. Another aspect includes decrypting the wrapped key block of the wrapped key token using a KEK to generate the CCA key data section and a first control vector portion. Another aspect includes assembling the control vector of the CCA key token from the first control vector portion and a second control vector portion that is located in the associated data section.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Embodiments of key wrapping for a CCA key token are provided, with exemplary embodiments being discussed below in detail. A control vector is a data structure comprising one or more fields of predefined values which collectively describe the intended usage of a cryptographic key with which it is associated. The control vector is specified by the key originator at key creation time. In a CCA key token, key attributes are stored in the control vector, which is not encrypted. A CCA key may be wrapped using a different type of encryption, for example, AES key wrapping (AESKW), to produce an AESKW key token that holds the CCA key and its attributes. AESKW is defined in American National Standards Institute (ANSI) standard X9.102. In the resulting AESKW key token, some attributes that are not encrypted in the control vector portion of a CCA key token are moved to an encrypted portion of an AESKW key token. These attributes are split from the control vector so that some attributes from the control vector are bound to the key but not encrypted, while other attributes are encrypted along with the key itself. In various embodiments, any appropriate type of encryption may be used to wrap a CCA key.

Keys are generally encrypted when the keys are outside of a protected environment. Encrypted keys are generally carried in a protected data structure called a key token or a key block (hereinafter key token). An AESKW key token contains two sections: key data, which is encrypted in order to keep the key secret, and attributes, which are cryptographically bound to the key to protect against alteration, but are not encrypted and do not need to be secret. A CCA key token includes a bound but not encrypted control vector, a flag section, which is neither encrypted nor bound, and encrypted key data.

A legacy CCA key, which may comprise a data encryption standard (DES) key or a double-length or triple-length triple DES (TDES) key in various embodiments, may be exported to an AES-protected token for transport, and the AES-protected token may be imported to the TDES format for use on the receiving system. The CCA key at the receiving system corresponds to the CCA key on the sending system; the key and attributes in the CCA key on an importing system may be identical to the CCA key on an exporting system, with the exception of system-dependent values. When encrypted using symmetric key techniques, CCA keys are encrypted using other CCA keys, which are known as key encrypting keys (KEKs). However, The AES encryption algorithm is stronger than TDES, therefore, wrapping legacy CCA keys with AES KEKs may be performed to strengthen security of the CCA keys.

For a DES or TDES key, the control vector is a sequence of bits identical in length to the key itself, for example, either 8, 16, or 24 bytes. For example, for a 16 byte control vector, the second 8 bytes are identical to the first 8 bytes, with the exception of a field called the key form field, which identifies it as the second part of a double-length (16 byte) control vector. The control vector is made up of a number of bit fields of varying lengths. Each bit field contains values that indicate attributes of the key, and the control vector fields are checked by the CCA firmware in order to determine if the key is eligible to be used in a requested operation. Many bits in the control vector are polymorphic, meaning that their definition changes depending on the overall type of key indicated by fixed-definition fields in the control vector. Various types of information can be encoded into a control vector of a CCA key, such as the key length, and key type and subtype, which defines the operations for which the key can be used, such as: encrypting/decrypting data; computing/verifying message authentication codes; encrypting other keys (KEKs); protecting financial personal identification numbers (PINs); deriving other keys; and/or computing credit card verification values. An export control field in the control vector indicates whether the key can be exported to another system. For most key types, the control vector also includes one or more fields that indicate specific low-level operations for which the key can be used, or specific data formats for which the key can be used. The key length may be indicated by a three-bit key form field in the control vector of the CCA token.

The AESKW process encrypts the key to be wrapped, but it does not encrypt the associated data for that key. The associated data is cryptographically bound to the key so that any changes can be detected, but the associated data is transported with the key in clear text (unencrypted) form. Thus, information that may reduce security if its value is disclosed is not put in the associated data. Attributes which cause no harm by appearing in clear text (and which sometimes must be visible without decrypting the key token) are carried in the associated data, while those that must be secret for security reasons are carried in the encrypted payload. During wrapping of a CCA key in AESKW form, indications of key length are moved from the clear text control vector in the CCA token and placed in the encrypted payload of the AESKW token. This allows the strength of a cryptographic key may be hidden when the key is in encrypted token form; because shorter keys are easier to attack, knowledge of the length of a key will help an attacker identify the easiest keys to try and break.

Figure 1:
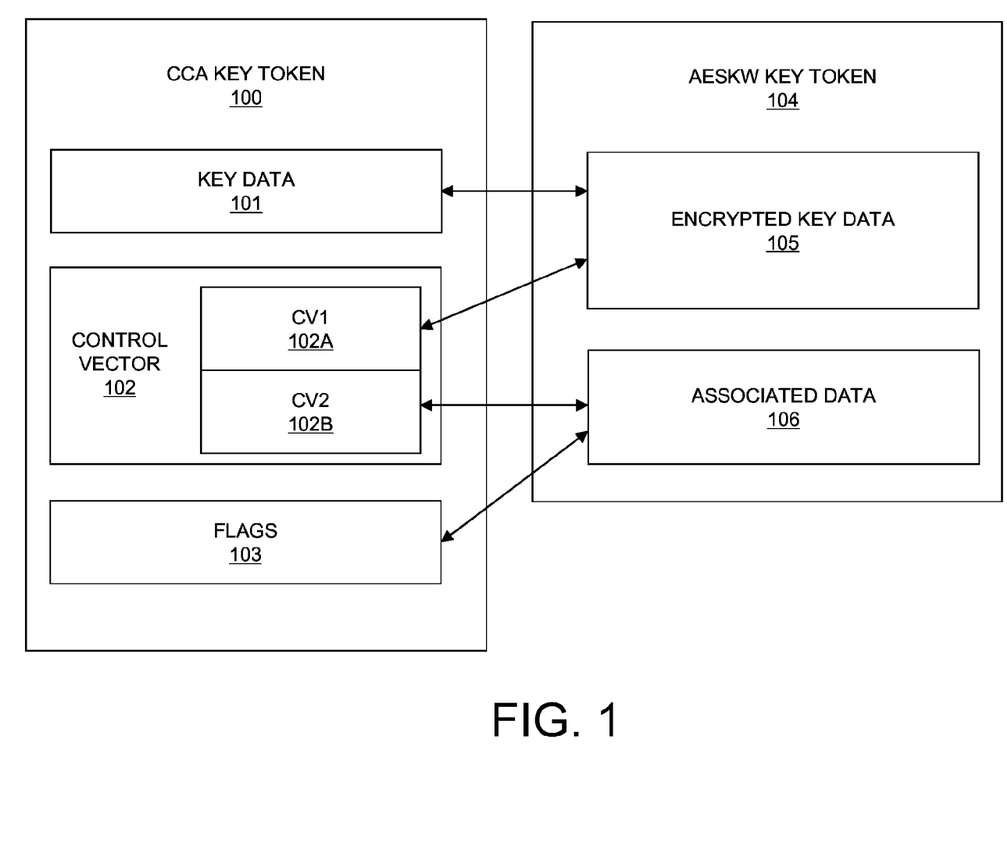
FIG. 1 depicts a CCA key token and an AES key wrapping (AESKW) key token for AES key wrapping for a CCA key token in accordance with an embodiment.

Turning now to FIG. 1, CCA key token 100 and an AESKW key token 104 for AES key wrapping for a CCA key is generally shown. CCA key token 100 may comprise a DES or TDES key in various embodiments, and includes key data 101, control vector 102, and flags 103. Key data 101 holds the key itself, and is encrypted for transport so as to keep the key data 101 secret, but is not encrypted when the CCA key token 100 is stored on a secure system such as a hardware security module (HSM). Control vector 102 holds additional attributes and information regarding the key in key data 101 in CCA key token 100 and is not encrypted for transport, but is bound to the CCA key token 100 to protect the data in control vector 102 against alteration. Control vector 102 is made up of a first set of fields CV1 102A, which are security-critical and must be kept secret and may include a length of the key, and a second set of fields CV2 102B, which are security-critical and must be protected against alteration, but do not need to be kept secret. Flags 103 are not encrypted or bound, and hold non-security critical information regarding the CCA key token 100. AESKW key token 104 includes encrypted key data 105, which holds the key itself in addition to other information regarding the key, and is encrypted. Associated data 106 is bound to the AESKW key token 104, but is not encrypted. In order to wrap the CCA key token 100 using AES, the key data 101 is encrypted using AES in encrypted key data 105. Fields in CV1 102A in the control vector 102, which may include, for example, a key length indicator for the CCA key token 100, are encrypted in the encrypted key data 105 with key data 101. Fields in CV2 102B in the control vector 102 are used to create the bound, but not encrypted, associated data 106. Further, the non-bound flags 103 in the CCA key token 100 are bound to the AESKW key token in the associated data 106. CV2 102B and flags 103 may also be transmitted from an exporting system to an importing system separately from the AESKW key token 104 in some embodiments. In various embodiments, any appropriate fields from control vector 102 may be included in CV1 102A or CV2 102B.

Additional layout information for some embodiments of the key data 101, control vector 102, flags 103, encrypted key data 105, and associated data 106 are given below with respect to Tables 1-5. Flags 103 may be 1 byte in size, thus can support 8 1-bit flags in some embodiments. Some example flags that may be stored in flags 103 include:

| | |
|---|---|
| #define MASK_KEY | 0x80 /* encrypted key & MASTER KEY VERIFICATION PATTERN (MKVP) present */, |
| #define MASK_CV | 0x40 /* CV in token has been applied */, |
| #define MASK_NOCV | 0x20 /* KEK used for NOCV processing */, |
| #define MASK_AKEK | 0x10 /* ANSI KEK (AKEK) */, |
| #define MASK_AKEK_DOUBLE | 0x08 /* AKEK is double-length key */, |
| #define MASK_AKEK_PART_NOTARIZED | 0x04 /* AKEK is partially notarized */, |
| #define MASK_ANSI_PARTIAL_KEY | 0x02 /* key is an ANSI partial key */, and |
| #define MASK_XPORT_OK | 0x01 /* prohibit export when bit off */. |

Figure 2:
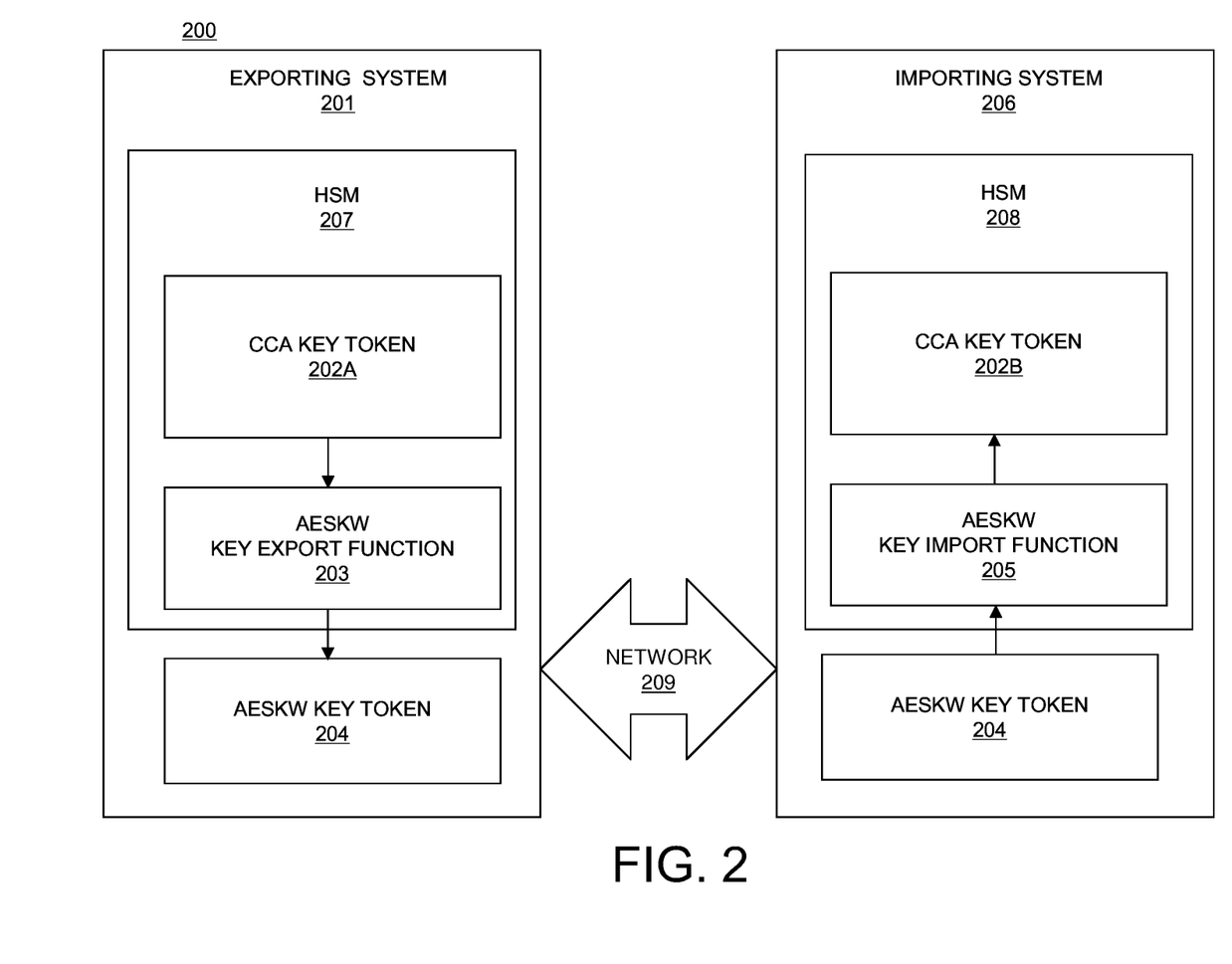
FIG. 2 depicts a system for key wrapping for a CCA key token in accordance with an embodiment.

FIG. 2 illustrates an embodiment of a system 200 for AES key wrapping for a CCA key token. System 200 includes an exporting system 201 and an importing system 206, which may each comprise any appropriate type of computer system comprising, for example, a processor and a memory. A CCA key token 202A, which comprises the fields shown with respect to CCA key token 100 of FIG. 1 and includes a control vector such as control vector 102, is stored in an HSM 207 on exporting system 201. In order to export CCA key token 202A, the exporting system 201 wraps the CCA key token 202A using a key export function 203, which is also located in the HSM 207 and is discussed in further detail below with respect to FIG. 3A, to generate an AESKW key token 204. The AESKW key token 204 is encrypted for transport, and comprises the fields shown with respect to AESKW key token 104 of FIG. 1, and is transmitted to importing system 206 via network 209. Network 209 may be any type of connection between exporting system 201 and importing system 206. The AESKW key token 204 is received by importing system 206 via network 209. Importing system 206 using key import function 205, which is located in an HSM 208 and is discussed in further detail below with respect to FIG. 3B, to unwrap the AESKW key token 204 and generate CCA key token 202B for use on importing system 206. CCA key token 202B on importing system 206 is securely stored in HSM 208 in some embodiments, and corresponds to CCA key token 202A on exporting system 201. In other embodiments, CCA key token 202B is encrypted and stored on importing system 208 outside of HSM 208. CCA key token 202B may be used for, for example, communication between exporting system 201 and importing system 206, or verification of sensitive data, such as personal identification numbers (PINs), on importing system 206.

Figure 3A:
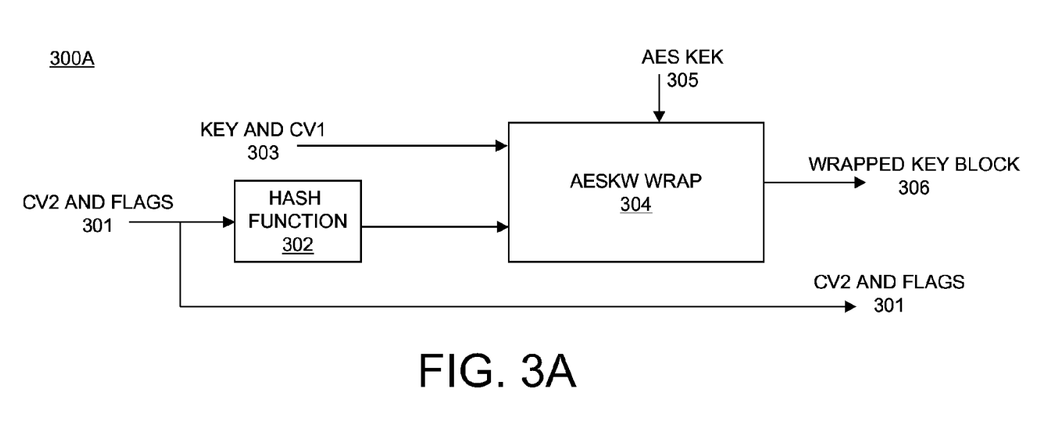
FIGS. 3A-B depict AESKW wrapping and unwrapping functions system for AES key wrapping for a CCA key token in accordance with an embodiment.

FIG. 3A illustrates an embodiment of a key export function 300A, which may comprise key export function 203 of FIG. 2 and is discussed with respect to FIGS. 1 and 2. Key export function 300A may be implemented in an HSM 207 in exporting system 201 in some embodiments. Key export function 300A receives unencrypted key data 101 and CV1 102A from control vector 102 in CCA key token 100/202 as key and CV1 303. CV2 102B and flags 103 are received by key export function 300A as CV2 and flags 301, and a hash of CV2 and flags 301 is input into AESKW wrap 304 from hash function 302. In some embodiments, the hash function 302 may compress the CV2 and flags 301 using a secure hash algorithm (SHA)-256 hash function, providing a value short enough for input to the AESKW wrap 304. In some embodiments, hash function 302 may be omitted, and CV2 and flags 301 may be input directly into AESKW wrap 304 to create the associated data 106. The key and CV1 303 are encrypted by AESKW wrap 304 using AES KEK 305 to generate an encrypted key data 105 of wrapped key block 306, which comprises an AESKW key token 104 as shown in FIG. 1. CV2 and flags 301 are not encrypted, but the hash of CV2 and flags 301 are included as associated data 106 in wrapped key block 306. CV2 and flags 301 are also bound to wrapped key block 306 by inclusion of binding information in the wrapped key block 306. CV2 and flags 301 are also transmitted as unencrypted plaintext along with wrapped key block 306 from exporting system 201 to importing system 206. The binding of CV2 and flags 301 to wrapped key block 306 ensures that any changes in the CV2 and flags 301, which may have occurred, for example, during transmission, will be detected.

Figure 3B:
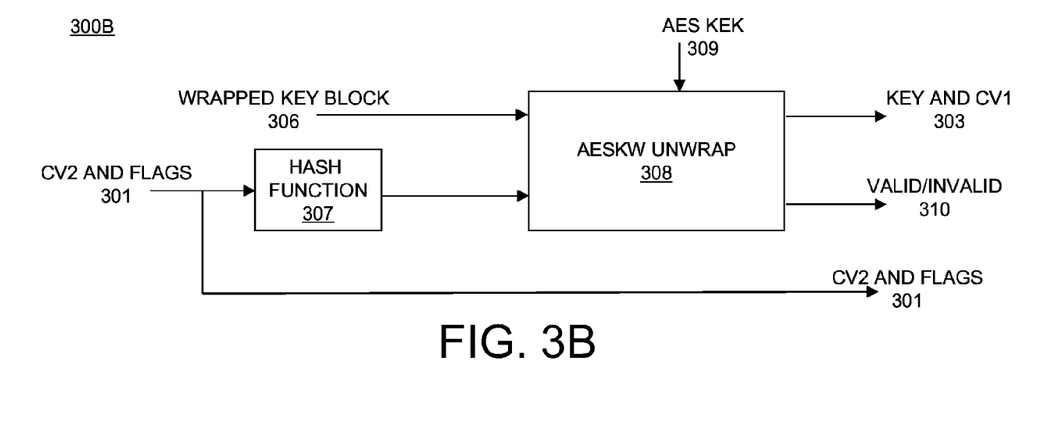

FIG. 3B illustrates an embodiment of a key import function 300B, which may comprise key import function 205 of FIG. 2 and is discussed with respect to FIGS. 1 and 2. Key import function 300B may be implemented in an HSM 208 in importing system 206 in some embodiments. Key import function 300B receives an AESKW key token 104/204 comprising wrapped key block 306, and plaintext CV2 and flags 301, which comprise associated data 106. The CV2 and flags 301 are hashed by hash function 307, and input to AESKW unwrap 308 along with the wrapped key block 306. In some embodiments, hash function 307 may be omitted, and CV2 and flags 301 may be input directly into AESKW unwrap 308. The wrapped key block 306 is decrypted by AESKW unwrap 308 using AES KEK 309 and output as key and CV1 303. The AESKW unwrap 308 also determines whether the CV2 and flags 301 were altered during transport based on the hash of CV2 and flags 301 and the binding information included in the wrapped key block 306. If it is determined that the CV2 and flags 301 were not altered, a valid flag is output at valid/invalid output 310 and the received key may be used by on importing system 206; otherwise, an invalid flag is output at valid/invalid output 310, and the received key is not used; in some embodiments, the AESKW unwrap 308 may not output key and CV1 303 based on an invalid flag. The key portion of key and CV1 303 comprises unencrypted key data 101 of FIG. 1; CV1 (from key and CV1 303) and CV2 (from CV2 and flags 301) together comprise the control vector 102 of FIG. 1, and the flags from CV2 and flags 301 comprise flags 103 of a CCA key token 100/202.

Figure 4:
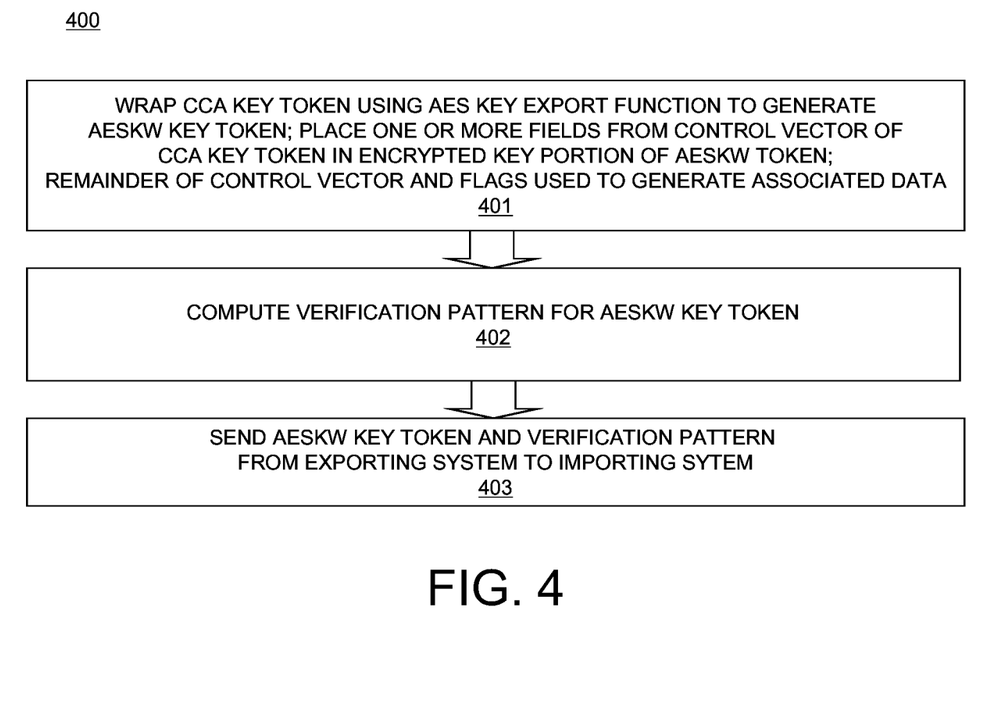
FIG. 4 depicts a process flow for exporting a CCA key token using AES key wrapping for a CCA key token in accordance with an embodiment.

FIG. 4 depicts a method 400 for exporting a CCA key token using AES key wrapping for CCA key token in accordance with an embodiment. FIG. 4 is discussed with respect to FIGS. 1-3. First, in block 401, a CCA key token 100/202 is wrapped on an exporting system 201 using an AES key export function, such as key export function 203/300A, to generate an AESKW key token 104/204. The control vector 102 is split into two portions, CV1 102A and CV2 102B. CV1 102A comprises data that needs to be encrypted for transport, such as key length. CV2 102B comprises data that does not need to be encrypted for transport. CV1 102A is encrypted in encrypted key data 105 with unencrypted key data 101 from the CCA key token 100, while CV2 102B is used to create the bound associated data 106. The flags 103 are also used to create the bound associated data 106. In block 402, a verification pattern is also computed for the AESKW key token 104/204 that was generated in block 401. Then, in block 403, the AESKW key token 104/204, plaintext CV2 102B and flags 103, and verification pattern are sent from the exporting system to an importing system.

Figure 5:
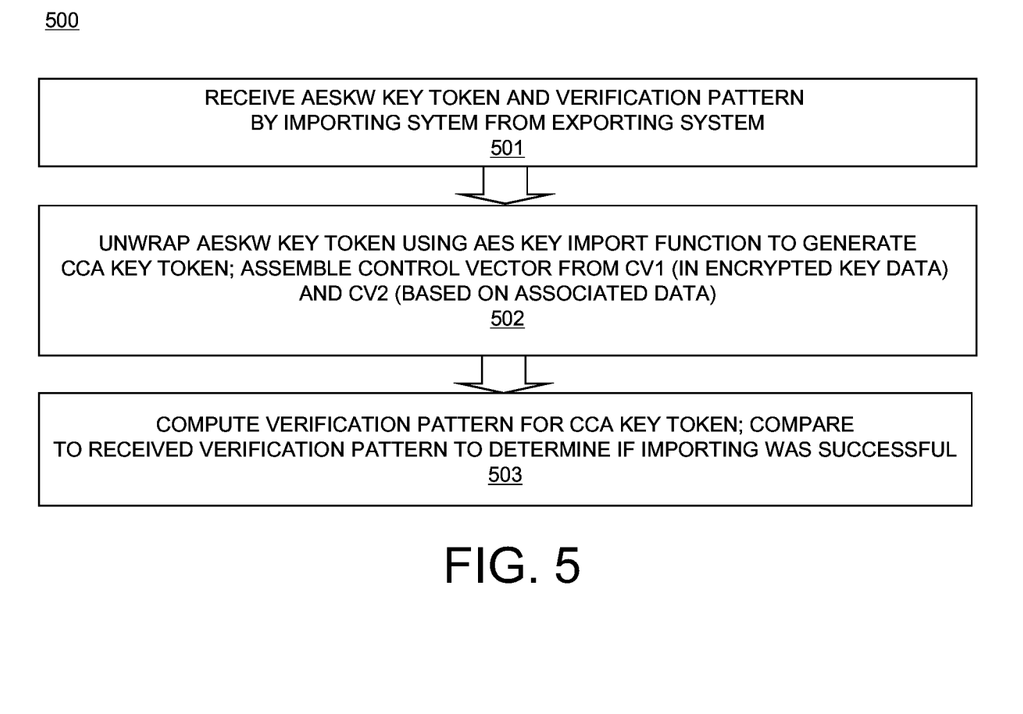
FIG. 5 depicts a process flow for importing a CCA key token using AES key wrapping for a CCA key token in accordance with an embodiment.
Figure 6:
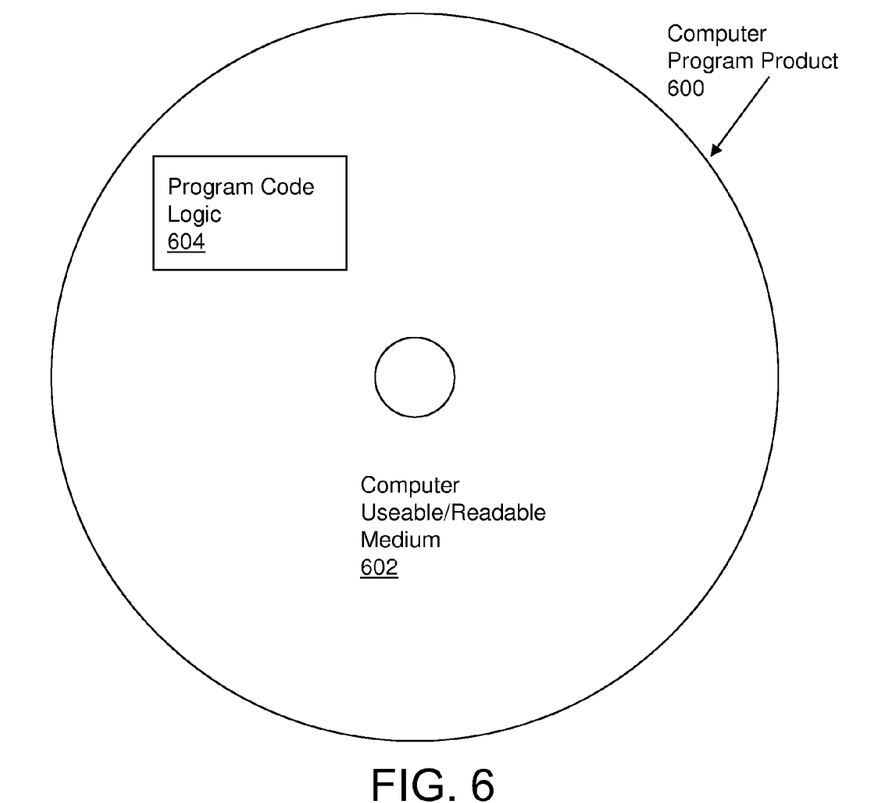
FIG. 6 depicts a computer program product in accordance with an embodiment.

FIG. 5 depicts a method 500 for importing a CCA key token using AES key wrapping for CCA key token in accordance with an embodiment. FIG. 5 is discussed with respect to FIGS. 1-3. First, in block 501, the AESKW key token 104/204, plaintext CV2 102B and flags 103, and verification pattern are received from the exporting system 201 by the importing system 206. Then, in block 502, the AESKW key token 104/204 is unwrapped on an importing system 206 using an AES key import function, such as key import function 205/300B, to generate a CCA key token 100/202. The control vector 102 in CCA key token 102/200 is assembled from two portions, CV1 102A (from encrypted key data 105), and CV2 102B (from associated data 106 and plaintext CV2 102B). Then, in block 503, a verification pattern is computed for the CCA key token 100/202 that was generated in block 502 and compared to the verification pattern that was received from the exporting system 201 to determine if CCA key token 100/202 is valid. If the computed and received verification patterns match in block 503, the CCA key token 100/202 is valid and may be used by importing system 206. If the computed and received verification patterns do not match in block 503, the CCA key token 100/202 is invalid.

Table 1 below shows the overall layout of an example TDES key token, which may comprise CCA key token 100 of FIG. 1, while Table 2 and Table 3 show flag bytes that are part of that token (i.e., flags 103).

TABLE 1

Example TDES key token layout

| Offset (bytes) | Length (bytes) | Description |
| --- | --- | --- |
| 0 | 1 | X'01' (a token identifier flag that indicates an internal key-token) |
| 1 | 3 | Reserved, binary zero |
| 4 | 1 | Token version number (X'00') |
| 5 | 1 | Reserved, binary zero |
| 6 | 1 | Flag byte 1 |
| 7 | 1 | Flag byte 2 |
| 8 | 8 | Master-key verification pattern |
| 16 | 8 | Single-length operational (master-key encrypted) key or the left half of a double-length operational key |
| 24 | 8 | Null, or the right half of a double-length operational key |

TABLE 1-continued

Example TDES key token layout

| Offset (bytes) | Length (bytes) | Description |
|---|---|---|
| 32 | 8 | Control-vector base |
| 40 | 8 | Null, or the control vector base for the right half of a double-length Key |
| 48 | 12 | Reserved, binary zero |
| 60 | 4 | Token-validation value |

TABLE 2

Example Layout of Flag byte 1

| Bits (MSB to LSB) | Description |
|---|---|
| 0xxx xxxx | An encrypted key is not present. |
| 1xxx xxxx | The encrypted key value and, if an internal fixed-length DES key-token, the masterkey verification pattern (version 0) or master-key version number (version 3) are present. |
| x0xx xxxx | The control vector value is not present. |
| x1xx xxxx | The control vector value is present. |

Note regarding Table 2:
All other bit combinations are reserved; undefined bits must be zero.

TABLE 3

Example Layout of Flag byte 2

| Bits (MSB to LSB) | Description |
|---|---|
| 000x xxxx | The encrypted key is wrapped using the legacy (WRAP-ECB) method. |
| 001x xxxx | The encrypted key is wrapped using the enhanced (WRAP-ENH) method. |

Note regarding Table 3:
All other bit combinations are reserved; undefined bits must be zero.

An example of a payload field (i.e., encrypted key data 105) of an AESKW token, such as AESKW key token 104, is shown in Table 4.

TABLE 4

Example Layout AESKW encrypted key data section

| Offset | Length (bytes) | Item | Contents |
|---|---|---|---|
| 0 | 1 | Key length (bytes) | X'18' Triple-length DES key (S390 only) X'10' Double-length DES key X'08' Single-length DES key |
| 1 | 1 | Flag byte 1 | Reserved, must be binary zeroes. |
| 2 | 1 | Flag byte 2 | B'xxxx xxx0' Key does not have guaranteed unique halves B'xxxx xxx1' Key has guaranteed unique halves (double-length key only) |
| 3 | 8 | Key A | double-length key, or only part of single-length key |
| 11 | 8 | Key B | Middle part of triple-length key S390 only), right part of double-length key, or random pad value |
| 9 | 8 | Key C | Right part of triple-length key (S390 only) or random pad value |

The payload of an AESKW key token may contain a single-length DES key, a double-length DES key, or a triple-length DES (TDES) key. If the token contains a key shorter than triple length, the payload is padded so that the field always has the same size regardless of the length of the key. By padding this field to a constant length, an attacker cannot look at the length of the encrypted key block in order to determine the length of the clear text key it contains. The padding bytes are random values to ensure that an attacker cannot use predictable contents of the payload in order to determine what the key contains.

The key length may be obtained from one of two places in the legacy CCA key token, depending on the format of the CCA token. In some embodiments, for single-length and double-length DES keys, the length is encoded in the key form bits of the control vector. In some embodiments, for triple-length DES keys, a separate field in the key token may specify the length.

An example of an associated data field (i.e., associated data 106) of an AESKW token, such as AESKW key token 104, of an AESKW token is shown in Table 5.

TABLE 5

Example Layout AESKW associated data section

| Offset | Length (bytes) | Item | Contents |
|---|---|---|---|
| 0 | 1 | Structure version identifier | X'00' |
| 1 | 1 | Flag byte 1 | Contains flag byte 1 as shown in Table 2 above. |
| 2 | 1 | Flag byte 2 | Contains flag byte 2 as shown in Table 3 above. |
| 3 | 8 | Masked control vector | Contains left half of control vector from offset 32-39 of the legacy input key token, but with key form bits masked to 0 to conceal key length. |

The associated data may contain all the bits of the control vector other than the key form bits, which are masked to values of binary 0. In some embodiments, only 8 bytes of the control vector are stored in the associated data, because the key form bits are the only value that is different in the other 8-byte parts of a control vector. In addition to the values from the control vector, the associated data has the two flag bytes from the legacy key token. These values are necessary in order to properly construct the new key token at the importing system.

Flag byte 2 in the Table 5 indicates whether the legacy token was wrapped using the Legacy CCA method or the Enhanced CCA method. CCA systems can use keys wrapped with either method, and system owners can set a preference for one or the other. The value in Flag byte 2 is used with rules built into CCA in order to decide whether the key should be wrapped with the legacy or enhanced method as it is imported into the receiving system.

Technical effects and benefits include enhanced security for exporting and importing CCA key tokens.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowcharts illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for wrapping of a common cryptographic architecture (CCA) key token, the method comprising:
   wrapping, by an exporting computer, the CCA key token using a key wrapping export function, the CCA key token comprising a CCA key data section and an unencrypted control vector, the wrapping comprising:
   splitting the control vector into a first control vector portion and a second control vector portion;
   encrypting the CCA key data section and the first control vector portion using an key encrypting key (KEK) to generate a wrapped key block;
   binding the second control vector portion to the wrapped key block to form an associated data section, wherein the associated data section is not encrypted, and wherein the wrapped key block and the associated data section comprise a wrapped key token; and
   binding an unencrypted flag field of the CCA key token with the second control vector portion to the wrapped key block to form the associated data section, wherein the control vector is bound to the CCA key data section, and wherein the flag field is not bound to the CCA key data section.

2. The method of claim 1, wherein the key wrapping export function comprises an advanced encryption standard (AES) key wrapping (AESKW) export function, wherein the KEK comprises an AES KEK, wherein the wrapped key token comprises a AESKW key token, and further comprising transmitting the AESKW key token to an importing computer.

3. The method of claim 2, further comprising:
   receiving the AESKW key token by the importing computer; and
   unwrapping, by the importing computer, the AESKW key token using an AESKW import function to form the CCA key token, the unwrapping comprising:
   decrypting the AES wrapped key block using an AES KEK to generate the CCA key data section and the first control vector portion; and
   assembling the control vector of the CCA key token from the first control vector portion and the second control vector portion in the associated data section.

4. The method of claim 3, further comprising:
   determining, by the importing computer, whether the associated data section was altered during transmission of the AESKW key token based on binding information located in the AES wrapped key block;

based on determining that the associated data section was not altered, using the CCA key token by the importing computer.

5. The method of claim 3, wherein CCA key token on the exporting computer corresponds to the CCA key token on the importing computer.

6. The method of claim 1, wherein the first control vector portion comprises a length of a key that comprises the CCA key token.

7. The method of claim 6, wherein the key that comprises the CCA key token comprises one of a data encryption standard (DES) key, and double-length and triple-length Triple-DES (TDES) keys.

8. A computer program product for implementing wrapping of a common cryptographic architecture (CCA) key token, the computer program product comprising:
   a non-transitory computer readable storage medium having program instructions embodied therewith, the program instructions readable by a processing circuit to cause the processing circuit to perform a method comprising:
   wrapping, by an exporting computer, the CCA key token using a key wrapping export function, the CCA key token comprising a CCA key data section and an unencrypted control vector, the wrapping comprising:
   splitting the control vector into a first control vector portion and a second control vector portion;
   encrypting the CCA key data section and the first control vector portion using an key encrypting key (KEK) to generate a wrapped key block;
   binding the second control vector portion to the wrapped key block to form an associated data section, wherein the associated data section is not encrypted, and wherein the wrapped key block and the associated data section comprise a wrapped key token; and
   binding an unencrypted flag field of the CCA key token with the second control vector portion to the wrapped key block to form the associated data section, wherein the control vector is bound to the CCA key data section, and wherein the flag field is not bound to the CCA key data section.

9. The computer program product of claim 8, wherein the key wrapping export function comprises an advanced encryption standard (AES) key wrapping (AESKW) export function, wherein the KEK comprises an AES KEK, wherein the wrapped key token comprises a AESKW key token, and further comprising transmitting the AESKW key token to an importing computer.

10. The computer program product of claim 9, further comprising:
    receiving the AESKW key token by the importing computer; and
    unwrapping, by the importing computer, the AESKW key token using an AESKW import function to form the CCA key token, the unwrapping comprising:
    decrypting the AES wrapped key block using an AES KEK to generate the CCA key data section and the first control vector portion; and
    assembling the control vector of the CCA key token from the first control vector portion and the second control vector portion in the associated data section.

11. The computer program product of claim 10, further comprising:
    determining, by the importing computer, whether the associated data section was altered during transmission of the AESKW key token based on binding information located in the AES wrapped key block;

based on determining that the associated data section was not altered, using the CCA key token by the importing computer.

12. The computer program product of claim 8, wherein the first control vector portion comprises a length of a key that comprises the CCA key token.

13. A method for wrapping of a common cryptographic architecture (CCA) key token, the method comprising:
receiving a wrapped key token by an importing computer, the wrapped key token comprising an encrypted wrapped key block and an unencrypted associated data section that is bound to the wrapped key block; and
unwrapping, by the importing computer, the wrapped key token using a key wrapping import function to form the CCA key token comprising a CCA key data section and an unencrypted control vector, the unwrapping comprising:
decrypting the wrapped key block of the wrapped key token using an key encrypting key (KEK) to generate the CCA key data section and a first control vector portion; and
assembling the control vector of the CCA key token from the first control vector portion and a second control vector portion that is located in the associated data section;
wherein the key wrapping import function comprises an advanced encryption standard (AES) key wrapping (AESKW) import function, wherein the KEK comprises an AES KEK, wherein the wrapped key token comprises a AESKW key token, and wherein the first control vector portion comprises a length of a key that comprises the CCA key token, wherein the AESKW key token is transmitted from an exporting computer to the importing computer, and wherein the AESKW key token is generated on the exporting computer by:
wrapping, by the exporting computer, the CCA key token using an AESKW export function, the wrapping comprising:
splitting the control vector into the first control vector portion and the second control vector portion;
encrypting the CCA key data section and the first control vector portion using an AES KEK to generate the AES wrapped key block;
binding the second control vector portion to the AES wrapped key block to form the associated data section, wherein the associated data section is not encrypted; and
binding an unencrypted flag field of the CCA key token with the second control vector portion to the wrapped key block to form the associated data section, wherein the control vector is bound to the CCA key data section, and wherein the flag field is not bound to the CCA key data section.

14. The method of claim 13, wherein CCA key token on the exporting computer corresponds to the CCA key token on the importing computer.

15. The method of claim 13, further comprising:
determining, by the importing computer, whether the associated data section was altered during transmission of the AESKW key token based on binding information located in the AES wrapped key block;
based on determining that the associated data section was not altered, using the CCA key token by the importing computer.

* * * * *